United States Patent
Yeh

(10) Patent No.: US 9,017,859 B2
(45) Date of Patent: Apr. 28, 2015

(54) SECONDARY BATTERY STRUCTURE

(75) Inventor: Sheng-Fa Yeh, Miaoli County (TW)

(73) Assignee: Industrial Technology Research Institute, Hsinchu (TW)

( * ) Notice: Subject to any disclaimer, the term of this patent is extended or adjusted under 35 U.S.C. 154(b) by 505 days.

(21) Appl. No.: 13/180,563

(22) Filed: Jul. 12, 2011

(65) Prior Publication Data

US 2012/0270084 A1 Oct. 25, 2012

(30) Foreign Application Priority Data

Apr. 19, 2011 (TW) .............................. 100113601 A

(51) Int. Cl.
  H01M 10/04 (2006.01)
  H01M 2/02 (2006.01)
  H01M 2/04 (2006.01)
  H01M 2/26 (2006.01)
  H01M 2/30 (2006.01)

(52) U.S. Cl.
  CPC ............ *H01M 2/022* (2013.01); *H01M 2/0426* (2013.01); *H01M 2/046* (2013.01); *H01M 2/263* (2013.01); *H01M 2/30* (2013.01)

(58) Field of Classification Search
  CPC ...................................................... H01M 10/04
  USPC ............................................................ 429/94
  See application file for complete search history.

(56) References Cited

U.S. PATENT DOCUMENTS

| 4,732,826 | A | 3/1988 | Hardigg |
| 5,707,758 | A | 1/1998 | Iwatsu et al. |
| 6,146,725 | A | 11/2000 | Code |
| 7,087,347 | B2 | 8/2006 | Shen |
| 7,285,355 | B2 | 10/2007 | Ruth et al. |
| 2001/0004503 | A1 | 6/2001 | Kondo |
| 2005/0037260 | A1 | 2/2005 | Shen |
| 2007/0154797 | A1 | 7/2007 | Hyung et al. |
| 2009/0246605 | A1* | 10/2009 | Chang et al. .................... 429/54 |

FOREIGN PATENT DOCUMENTS

| CN | 2257804 | 7/1997 |
| CN | 2587066 | 11/2003 |
| CN | 201058713 | 5/2008 |
| CN | 101212068 | 7/2008 |
| CN | 201175806 | 1/2009 |
| CN | 201655906 | 11/2010 |

(Continued)

OTHER PUBLICATIONS

"Office Action of China Counterpart Application", issued on Feb. 11, 2014, p. 1-p. 8, in which the listed references were cited.

(Continued)

*Primary Examiner* — Ula C Ruddock
*Assistant Examiner* — Jacob Marks
(74) *Attorney, Agent, or Firm* — Jianq Chyun IP Office

(57) ABSTRACT

A secondary battery structure includes a jar body, a conductive stacked structure, and two end covers. The conductive stacked structure is configured in the jar body and at least includes a battery unit. The two end covers are respectively fixed at two ends of the jar body. The end covers are assembled to the jar body by inward compression in order to eliminate dimension errors of the conductive stacked structure in the jar body. The diameter of each end cover is smaller than or substantially equal to the inner diameter of the jar body.

12 Claims, 10 Drawing Sheets

(56) References Cited

FOREIGN PATENT DOCUMENTS

| | | | |
|---|---|---|---|
| JP | 09-328550 | * | 7/1999 |
| JP | 3519953 | | 2/2004 |
| JP | 2006040771 | | 2/2006 |
| JP | 2006073339 | | 3/2006 |
| JP | 2006338981 | | 12/2006 |
| JP | 2007042527 | | 2/2007 |
| JP | 2007184233 | | 7/2007 |
| JP | 2008084726 | | 4/2008 |
| JP | 2008130482 | | 6/2008 |
| JP | 2008269904 | | 11/2008 |
| JP | 2008311184 | | 12/2008 |
| JP | 2009123438 | | 6/2009 |
| JP | 2009123440 | | 6/2009 |
| JP | 2009187724 | | 8/2009 |
| JP | 2010015852 | | 1/2010 |
| JP | 2010092874 | | 4/2010 |
| JP | 2010140715 | | 6/2010 |
| KR | 200434772 | | 12/2006 |
| TW | M307846 | | 3/2007 |
| TW | I302389 | | 10/2008 |
| TW | M366179 | | 10/2009 |
| TW | I318473 | | 12/2009 |
| TW | I318475 | | 12/2009 |
| TW | M379178 | | 4/2010 |
| TW | M379179 | | 4/2010 |
| TW | M385096 | | 7/2010 |
| TW | M385808 | | 8/2010 |
| TW | M386602 | | 8/2010 |
| TW | I333704 | | 11/2010 |
| TW | I335685 | | 1/2011 |

OTHER PUBLICATIONS

"Notice of Allowance of Taiwan Counterpart Application", issued on Oct. 25, 2013, p. 1-p. 4, in which the listed references were cited.

"Office Action of China Counterpart Application", issued on Aug. 21, 2014, p. 1-p. 7, in which the listed references were cited.

* cited by examiner

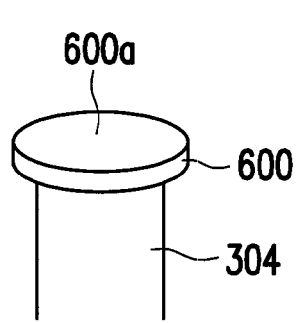 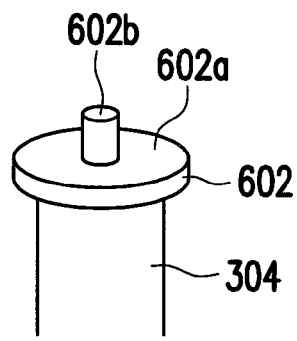
FIG. 6A    FIG. 6B
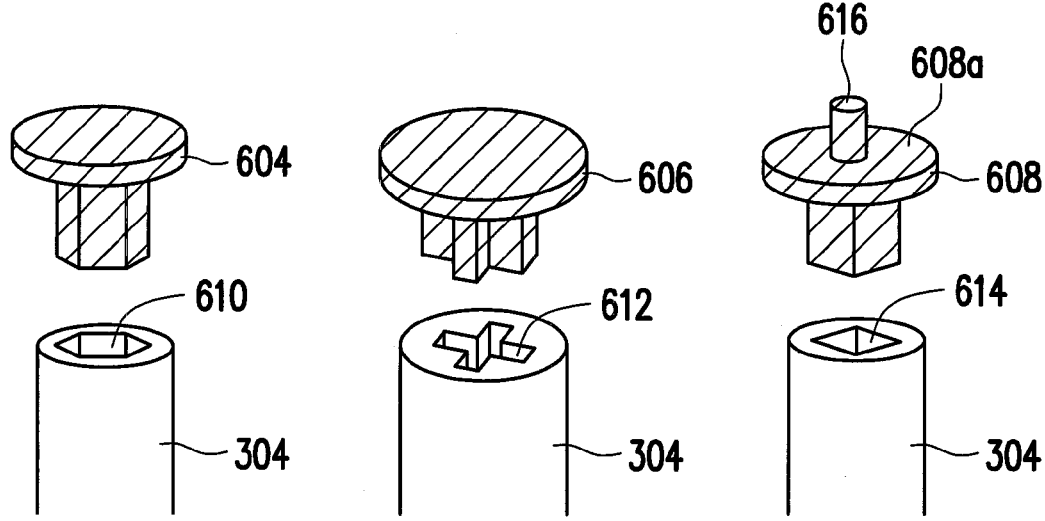
FIG. 6C    FIG. 6D    FIG. 6E

SECONDARY BATTERY STRUCTURE

CROSS-REFERENCE TO RELATED APPLICATION

This application claims the priority benefit of Taiwan application serial no. 100113601, filed Apr. 19, 2011. The entirety of the above-mentioned patent application is hereby incorporated by reference herein and made a part of this specification.

TECHNICAL FIELD

The disclosure relates to a secondary battery structure which has an anti-shock feature.

BACKGROUND

A conventional secondary battery structure as shown in FIG. 1A includes a jar body 100, end covers 102, battery terminals 104 penetrating the end covers 102, and screw nuts 106. As indicated in FIG. 1B, the conductive stacked structure in the jar body 100 often refers to a battery unit 114 constituted by a jelly-roll 108, a central rod 110, and conductive tabs 112. To ensure that the conductive tabs 112 are in contact with the battery terminals 104, an individual conductive terminal 116 is respectively configured at two ends of the central rod 110. Each individual conductive terminal 116 has a protrusion 118 and a fixing pin 120, the battery terminal 104 is screwed onto the protrusion 118, and the fixing pin 120 is fixed at the central rod 110. Besides, a circular hole 122 corresponding to the protrusion 118 is configured at the bottom of the battery terminal 104, and a rectangular hole 124 for correspondingly fixing the fixing pin 120 is configured at the two ends of the central rod 110, respectively. During assembly of the secondary battery structure, the protrusion 118 passes through the circular holes 126 of the conductive tabs 112, the fixing pins 120 are placed into the rectangular holes 124, and the tops of the battery terminals 104 pass through the screw nuts 106 and the end covers 102 depicted in FIG. 1A, so as to screw the end covers 102 and the conductive tabs 112 together.

The construction and configuration described above lead to dimension errors of the conductive stacked structure in the jar body 100, and therefore the fixing pins 120 are partially exposed and are not completely inserted into the central rod 110 in most cases, as indicated in FIG. 1C, which is a schematic cross-sectional view illustrating a portion of the secondary battery structure after assembly. Due to the dimension errors, a gap that allows the jelly-roll 108 to move is formed between the jelly-roll 108 and the end covers 102. When an external force is applied to the secondary battery structure, e.g., when the secondary battery structure is vibrated or hit, the battery unit (e.g., the jelly-roll 108) in the jar body 100 moves up and down because of gravity or the inertial force. Thereby, the jellyroll-shaped battery cell hits the conductive stacked structure and is damaged, which may pose a safety hazard to users. Furthermore, when the end covers 102 and the conductive tabs 112 are screwed together, metallic fragments are likely to fall into the jar body 100, which raises issues of electrical properties and safety.

SUMMARY

A secondary battery structure is introduced herein. The secondary battery structure includes a jar body, a conductive stacked structure, and two end covers is provided. The conductive stacked structure is configured in the jar body and at least includes a battery unit. The two end covers are respectively fixed at two ends of the jar body. Moreover, the end covers are assembled to the jar body by inward compression in order to eliminate dimension errors of the conductive stacked structure in the jar body. A diameter of each of the end covers is smaller than or substantially equal to an inner diameter of the jar body.

Based on the above, the end covers are assembled to the jar body of the secondary battery structure by inward compression, and thus the dimension errors of the conductive stacked structure in the jar body can be eliminated. Namely, conventional problems of screwing the end covers to the jar body of the secondary battery structure can be solved. Besides, the conductive tabs can be sandwiched by the central rod and the battery terminals of the battery unit. Thereby, the secondary battery structure described in the embodiments of the disclosure is rather simple and cost-effective.

Several exemplary embodiments accompanied with figures are described in detail below to further describe the disclosure in details.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

FIG. 6A to FIG. 6E are schematic views illustrating different types of central rods.

DETAILED DESCRIPTION OF DISCLOSED EMBODIMENTS

Figure 1A:
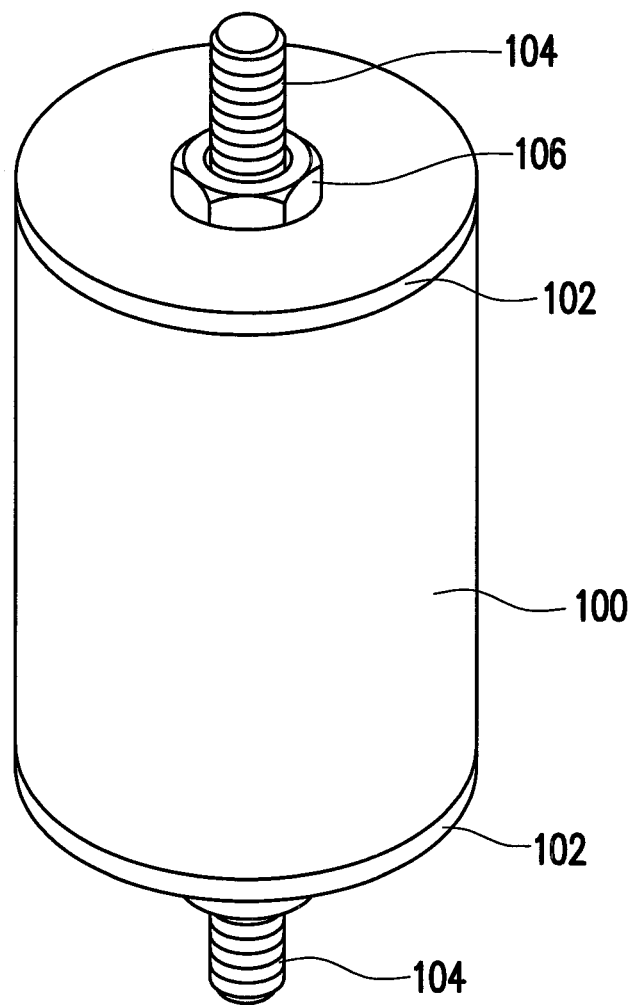
FIG. 1A is a three-dimensional view illustrating a conventional secondary battery.
Figure 1B:
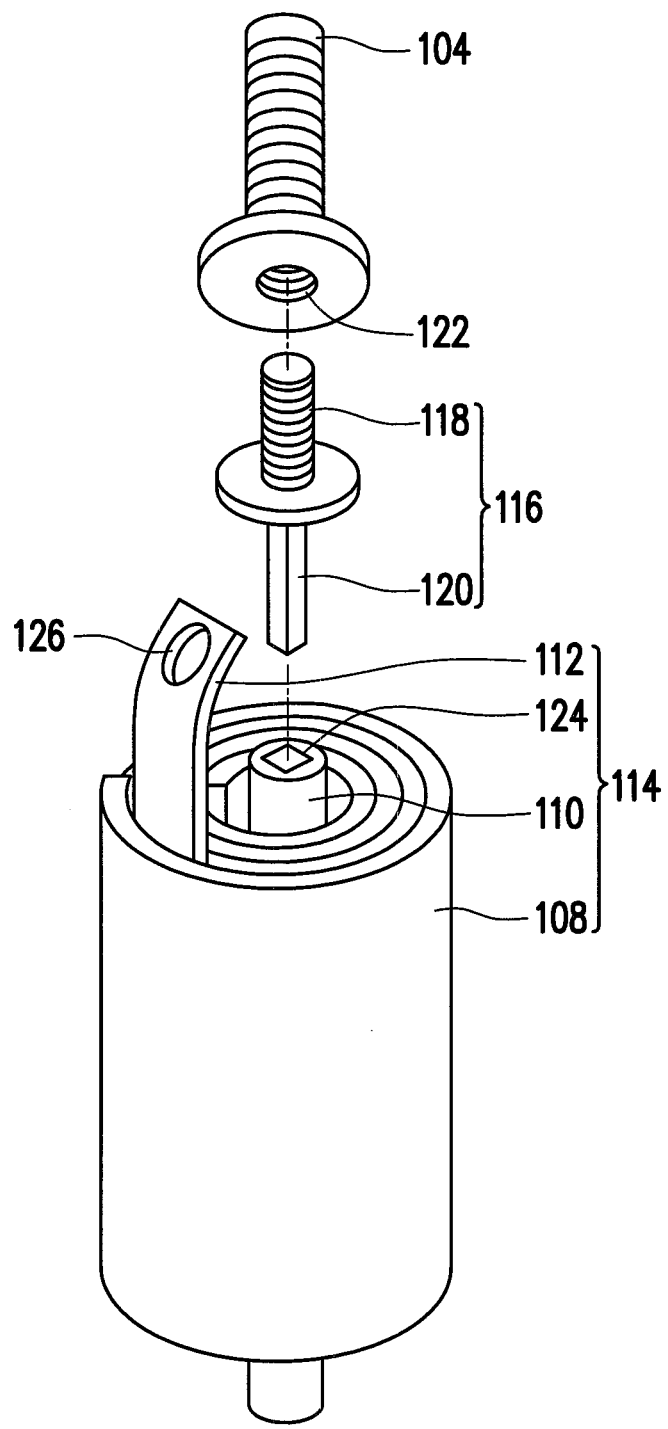
FIG. 1B is a three-dimensional view illustrating a conductive stacked structure in the jar body 100 depicted in FIG. 1A.
Figure 1C:
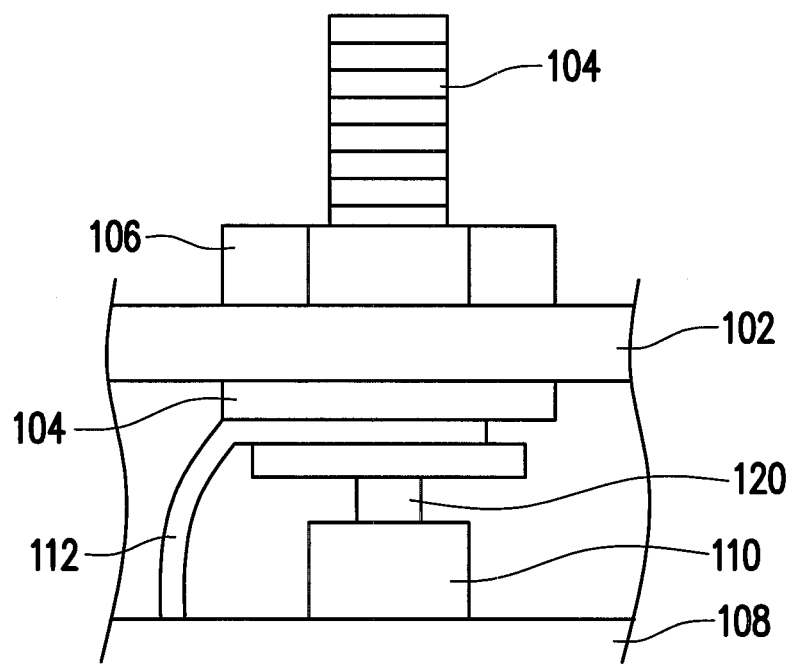
FIG. 1C is a schematic cross-sectional view illustrating a portion of the secondary battery structure after assembly.

Descriptions accompanied with drawings are provided below to sufficiently explain embodiments of the disclosure. This disclosure, however, may be embodied in many different forms and should not be construed as limited to the embodiments set forth herein. In the drawings, in order to apparently indicate the size and the relative size of each layer and region, the layers and regions are magnified and may not be illustrated in accurate proportion.

Figure 2:
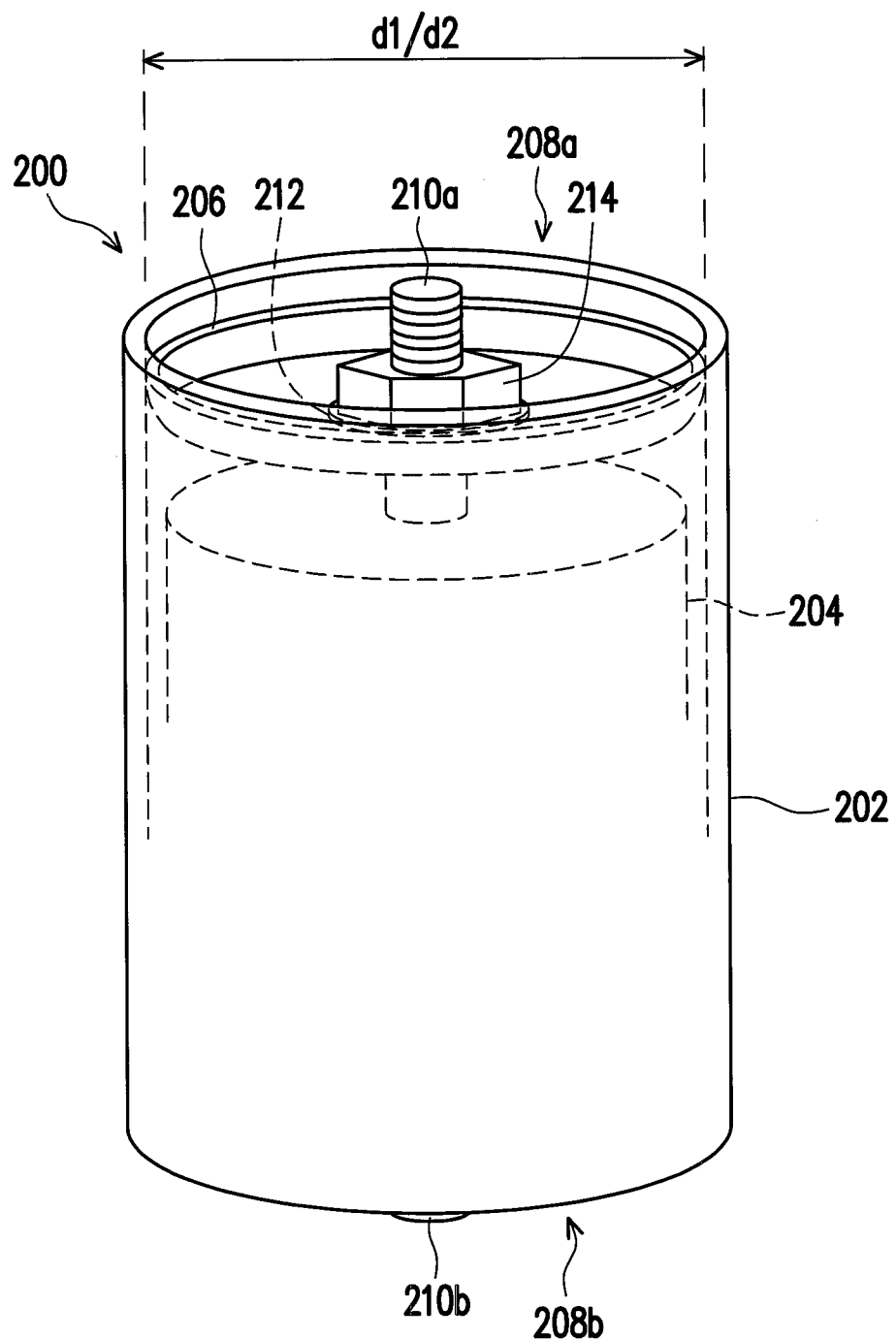
FIG. 2 is a schematic three-dimensional view illustrating the assembly of the secondary battery structure according to a first embodiment of the disclosure.

FIG. 2 is a schematic three-dimensional view illustrating the assembly of the secondary battery structure according to a first embodiment of the disclosure. To simplify the illustration, some components are omitted in the drawings.

With reference to FIG. 2, the secondary battery structure 200 of the first embodiment includes a jar body 202, a conductive stacked structure 204, and end covers 206. The conductive stacked structure 204 is configured in the jar body 202 and at least includes a battery unit (not shown). The end cover 206 is fixed at an end 208a of the jar body 202. Another end cover 206 is fixed at the other end 208b of the jar body 202, which is however not shown in FIG. 2. The end covers 206 are assembled to the jar body 202 by inward compression to eliminate dimension errors of the conductive stacked structure 204 in the jar body 202. Namely, there is no space for stacking components between the end covers 206 and the conductive stacked structure 204. A diameter d1 of each of the end covers 206 is smaller than or substantially equal to an inner diameter d2 of the jar body 202. In this embodiment, the jar body 202 is cylindrical, and thus the end covers 206 correspondingly have a shape of a circular plate. Note that the disclosure is not limited to what is shown in FIG. 2. In other embodiments of the disclosure, the end covers 206 can have a shape of a bowl or a circular disk.

As indicated in FIG. 2, the secondary battery structure 200 further includes two battery terminals 210a and 210b which penetrate the end covers 206. The battery terminals 210a and 210b and the end covers 206 are usually connected and sealed by insulation pads 212, screw nuts 214, or other components. After the end covers 206 are inwardly compressed into the jar body 202, the end covers 206 can be welded to the jar body 202.

Figure 3:
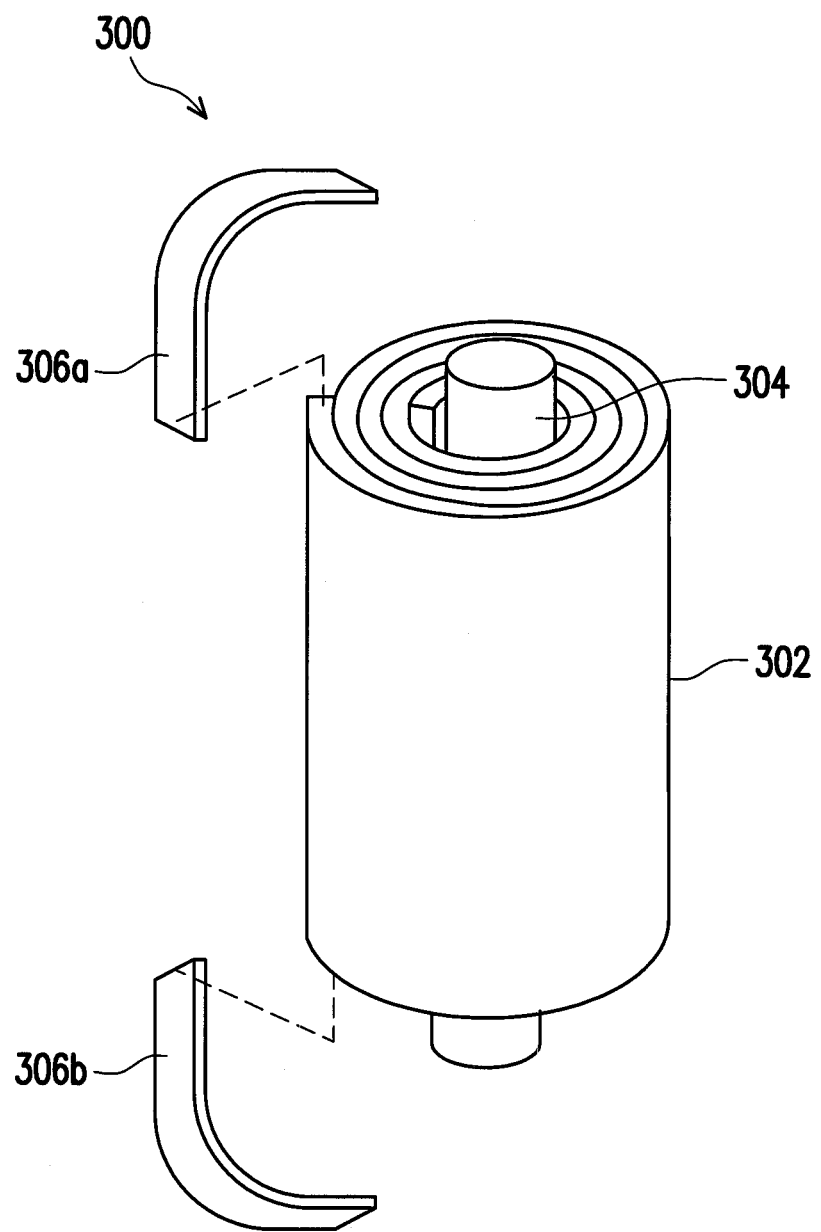
FIG. 3 is a three-dimensional explosive view illustrating the battery unit depicted in FIG. 2.

FIG. 3 is a three-dimensional explosive view illustrating the battery unit depicted in FIG. 2. In FIG. 3, the battery unit 300 includes a jelly-roll 302, a central rod 304, and conductive tabs 306a and 306b. The jelly-roll 302 is often formed by rolling up an anode, a cathode, and electrolyte that separates the anode from the cathode. Since the detailed structure of the jelly-roll 302 is well known to people having ordinary skill in the art, it is not further illustrated in FIG. 3. The central rod 304 is located at the center of the jelly-roll 302, and the conductive tabs 306a and 306b are respectively connected to the anode and the cathode of the jelly-roll 302.

Figure 4:
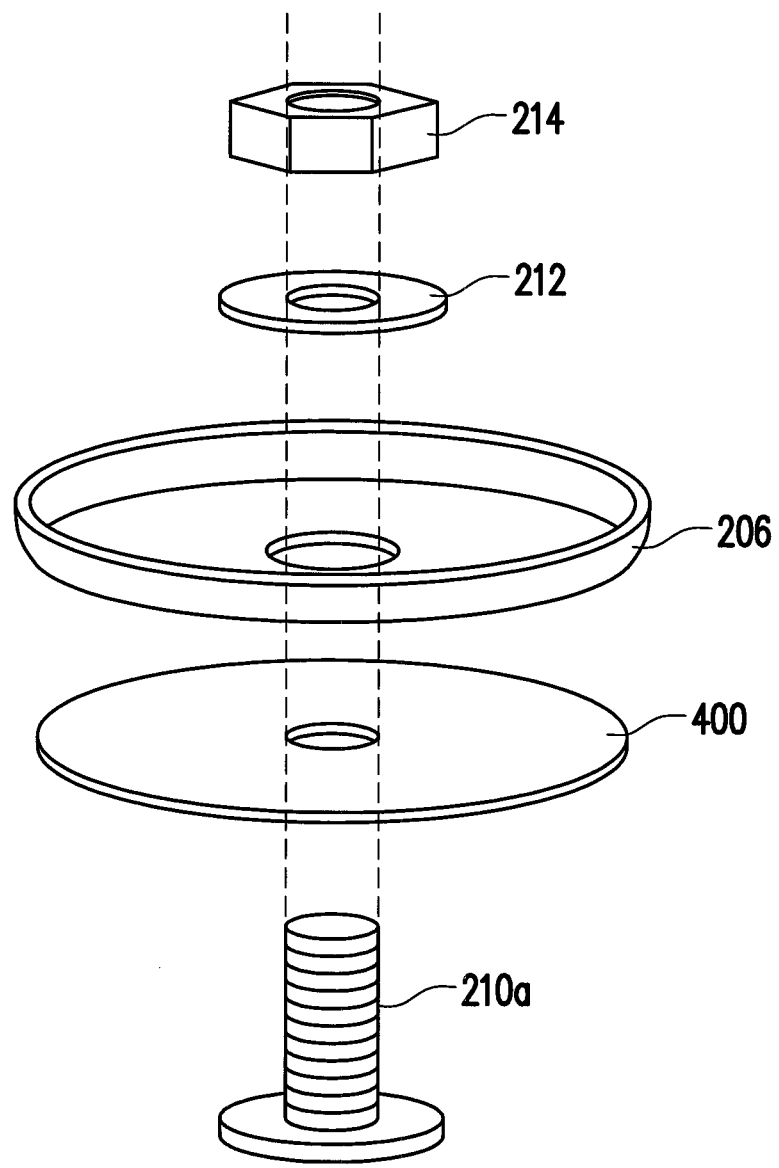
FIG. 4 is a three-dimensional explosive view illustrating a sealing structure of the battery terminals and the end covers depicted in FIG. 2.

FIG. 4 is a three-dimensional explosive view illustrating a sealing structure of the battery terminals and the end covers depicted in FIG. 2. With reference to FIG. 4, the battery terminal 210a and the end cover 206 are separated by an insulation airtight pad 400, and the insulation pad 212, the screw nut 214, the insulation airtight pad 400, and the battery terminal 210a are all screwed to the end cover 206.

Figure 5:
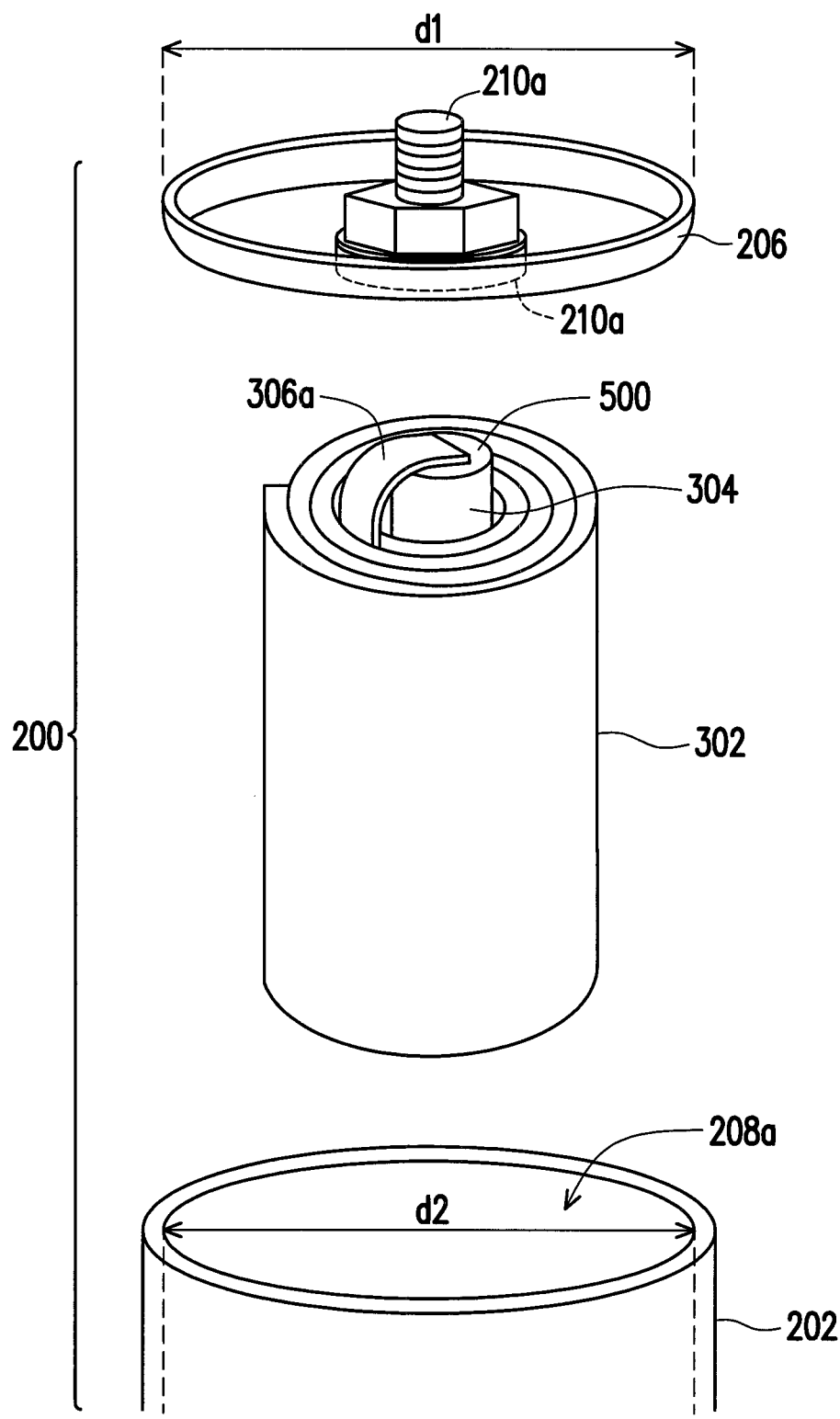
FIG. 5 illustrates the assembly of the secondary battery structure according to the first embodiment of the disclosure.

Hence, as shown in FIG. 5, the secondary battery structure 200 of the first embodiment is assembled by placing the battery unit 300 into the jar body 202 from the end 208a of the jar body 202 and inwardly compressing the end cover 206. After that, the end cover 206 at the other end 208b of the jar body 202 is assembled. During assembly, since the end cover 206 is inwardly compressed into the jar body 202, the conductive tab 306a connected to the anode or the cathode of the jelly-roll 302 can be sandwiched by an end 500 of the central rod 304 and the bottom of the battery terminal 210a, such that the current can be collected at the battery terminal 210a. As shown in FIG. 5, the battery terminal 210a and the conductive tab 306a can be electrically connected due to the configuration of the central rod 304 and the battery terminal 210a, and therefore the secondary battery structure 200 is simple and cost-effective.

Certainly, the central rod 304 can have other structures in addition to the structure shown in FIG. 5. Please refer to FIG. 6A to FIG. 6E.

In FIG. 6A, the terminal 600 and the central rod 304 are integrally formed. A surface 600a of the terminal 600 which is in contact with the conductive tab is a plane, such that the conductive tab can be sandwiched by the planar surface of the terminal 600 and the battery terminal. In FIG. 6B, the terminal 602 and the central rod 304 are integrally formed. Besides, a surface 602a of the terminal 602 which is in contact with the conductive tab has a protrusion 602b. The protrusion 602b penetrates the conductive tab (e.g., the conductive tab 306a shown in FIG. 5) to position the conductive tab. The terminal 600 or 602 and the central rod 304 which are integrally formed can be made of a non-conductive material.

As indicated in FIG. 6C to FIG. 6E, the terminal 604, 606, or 608 is separated from the central rod 304 and can be made of a conductive material or a non-conductive material. In order to combine the central rod 304 and the terminal 604, 606, or 608, the central rod 304 can have a polygonal hole, and the terminal 604, 606, or 608 can have a fixing pin. The shape of the fixing pin corresponds to the shape of the hole of the central rod 304. For instance, the central rod 304 has a hexagonal hole 610 (shown in FIG. 6C), a crisscross hole 612 (shown in FIG. 6D), or a rectangular hole 614 (shown in FIG. 6E), and the shape of the fixing pin of the terminal 604, 606, or 608 is correspondingly designed. Thereby, the terminal 604, 606, or 608 can be fixed to the central rod 304. Besides, the terminal 608 can further have a protrusion 616 on the surface 608a which is in contact with the conductive tab, and the protrusion 616 penetrates the conductive tab.

Figure 7:
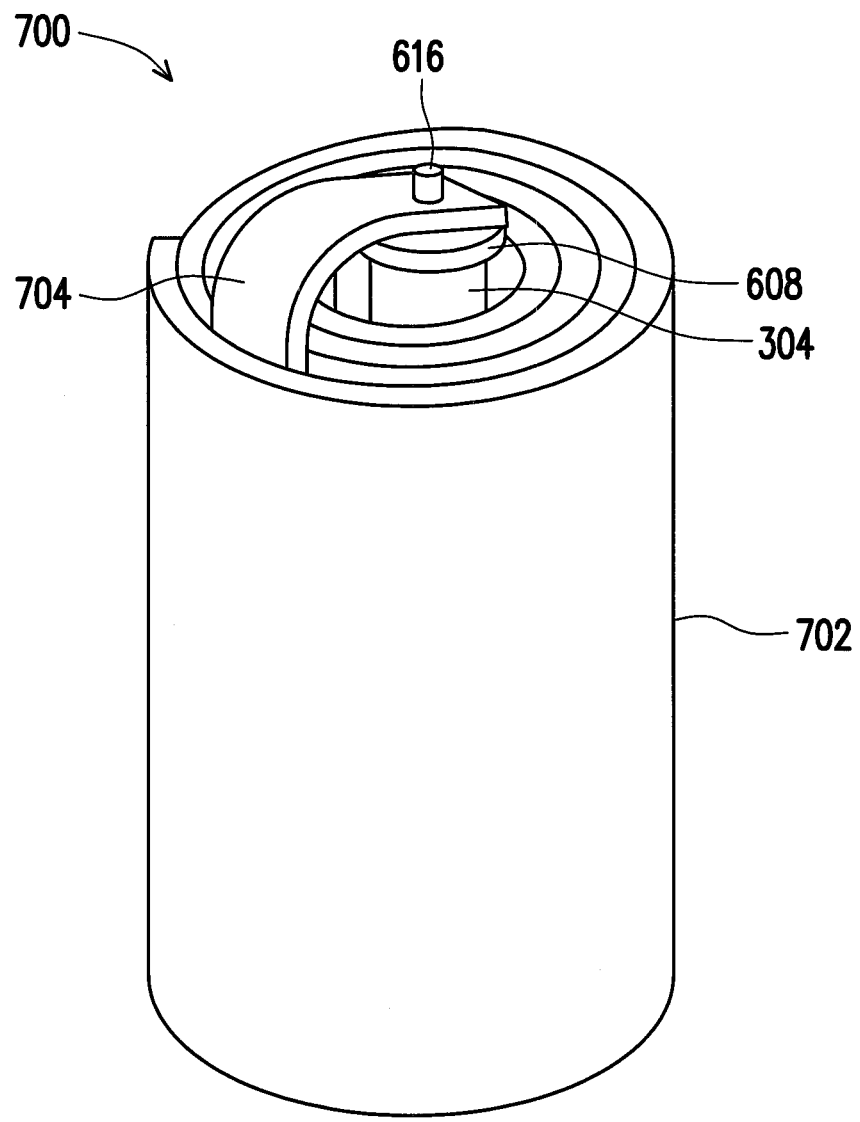
FIG. 7 is a three-dimensional view illustrating the battery unit which is formed by assembling the structure depicted in FIG. 6E.

FIG. 7 is a three-dimensional view illustrating the battery unit which is formed by assembling the structure depicted in FIG. 6E. With reference to FIG. 7, the battery unit 700 includes a jelly-roll 702, the central rod 304, and a conductive tab 704. The protrusion 616 of the terminal 608 can penetrate the conductive tab 704. Alternatively, the protrusion 616 passes through the conductive tab 704 through the hole (not shown) in the conductive tab 704. In FIG. 7, one conductive tab 704 is shown. However, people having ordinary skill in the pertinent art are aware that the conductive tab connected to one pole (the anode or the cathode) of the jelly-roll 702 can be one or more. Besides, the conductive tabs 704 fixed at the same terminal 608 are often connected to the same pole of the jelly-roll 702.

Figure 8:
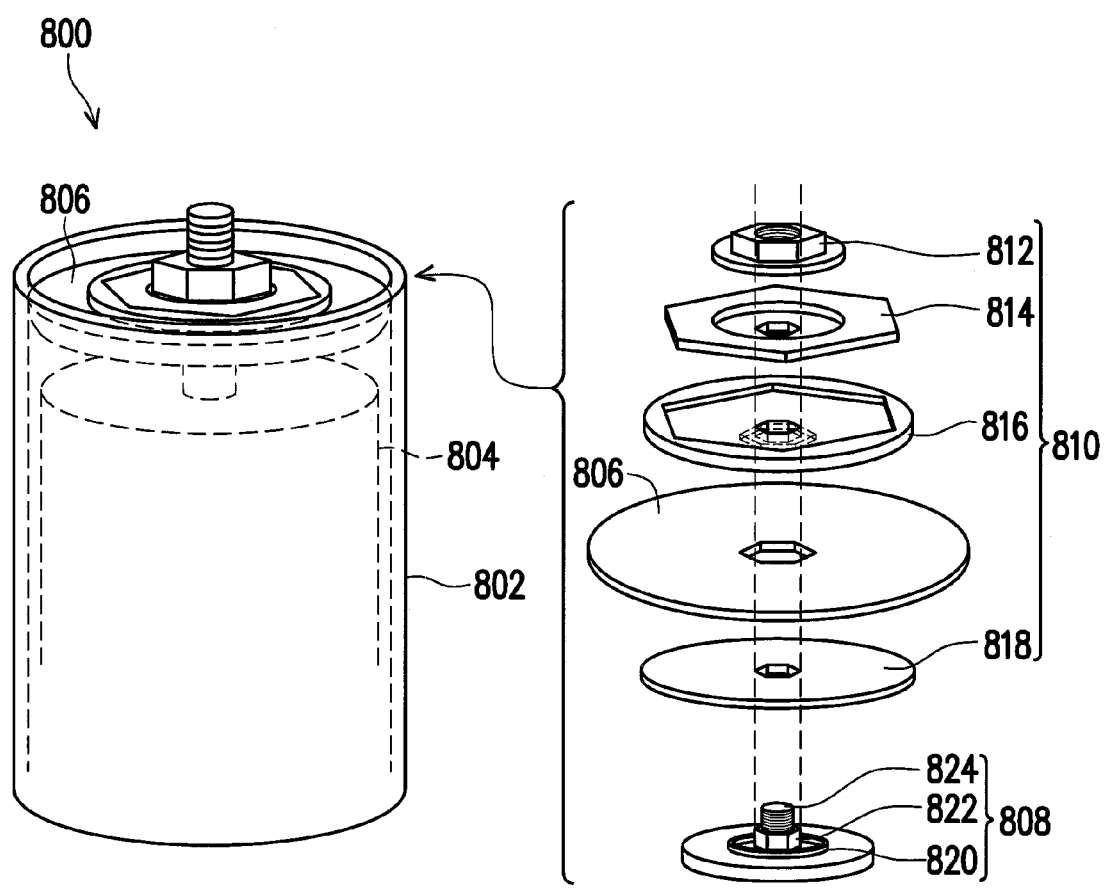
FIG. 8 is a schematic three-dimensional view illustrating the assembly of the secondary battery structure according to a second embodiment of the disclosure.

FIG. 8 is a schematic three-dimensional view illustrating the assembly of the secondary battery structure according to a second embodiment of the disclosure. To simplify the illustration, some components are omitted in the drawings.

With reference to FIG. 8, the secondary battery structure 800 of the second embodiment includes a jar body 802, a conductive stacked structure 804, and an end cover 806. The assembled structure is shown at the left portion of FIG. 8, while the right portion of FIG. 8 is an explosive view illustrating the end cover 806 in a shape of a circular plate, the battery terminal 808, and a sealing assembly 810. The sealing assembly 810 includes a screw nut 812, a stainless steel sheet 814, an insulation film 816, and an insulation airtight pad 818. The insulation film 816 is located between the end cover 806 and the screw nut 812. The stainless steel sheet 814 is located between the screw nut 812 and the insulation film 816. Here, the screw nut 812, the stainless steel sheet 814, and the insulation film 816 correspondingly have uneven structures, such that the screw nut 812 can be rotated to fix the battery terminal 808. The battery terminal 808 has an airtight ring 820, a hexagonal base 822, and a screw 824. After the sealing assembly 810 is assembled to and lodged in the hexagonal base 822, the screw nut 812 can be screwed to the screw 824. Here, the battery terminal 808 and the end cover 806 together clamp and squeeze the insulation airtight pad 818 in order to accomplish the sealing effect to a greater extent. The end cover 806 is assembled to the jar body 802 by inward compression, and thereby the dimension errors of the conductive stacked structure 804 in the jar body 802 can be eliminated.

In light of the foregoing, the end covers of the secondary battery structure are assembled to the jar body by direct inward compression according to the embodiments of the disclosure. Namely, it is not necessary to screw the end covers to the jar body, and the end covers can still be fixed to the jar body. Thereby, the conductive tabs and the battery terminals can be well positioned, and the dimension errors of the conductive stacked structure in the jar body can be eliminated. As such, the conventional problems of screwing the end covers to the jar body of the secondary battery structure can be prevented according to the embodiments of the disclosure. Moreover, the conventional structure for clamping the conductive tabs can be simplified, thus reducing the manufacturing costs.

It will be apparent to those skilled in the art that various modifications and variations can be made to the structure of the disclosure without departing from the scope or spirit of the disclosure. In view of the foregoing, it is intended that the disclosure cover modifications and variations of this disclosure provided they fall within the scope of the following claims and their equivalents.

What is claimed is:

1. A secondary battery structure at least comprising:
a jar body;
a conductive stacked structure configured in the jar body, the conductive stacked structure at least comprising a battery unit, wherein the battery unit comprises a jelly-roll, a central rod located at a center of the jelly-roll, and a plurality of conductive tabs respectively connected to an anode and a cathode of the jelly-roll;
two end covers respectively fixed at two ends of the jar body, wherein the end covers are assembled to the jar body by inward compression to eliminate dimension errors of the conductive stacked structure in the jar body, and a diameter of each of the end covers is smaller than or substantially equal to an inner diameter of the jar body; and
two battery terminals respectively penetrating the two end covers, wherein
the central rod of the battery unit comprises a first terminal and a second terminal, one of the conductive tabs connected to the anode of the jelly-roll is sandwiched by the first terminal and one of the two battery terminals, and one of the conductive tabs connected to the cathode of the jelly-roll is sandwiched by the second terminal and the other one of the two battery terminals, wherein the first and second terminals are made of a non-conductive material.

2. The secondary battery structure as recited in claim 1, wherein the jar body is cylindrical, and the two end covers have a shape of a circular plate.

3. The secondary battery structure as recited in claim 1, wherein the jar body is cylindrical, and the two end covers have a shape of a bowl or a circular disk.

4. The secondary battery structure as recited in claim 1, wherein the two end covers are welded into the jar body.

5. The secondary battery structure as recited in claim 1, wherein the first and second terminals and the central rod are integrally formed.

6. The secondary battery structure as recited in claim 1, wherein the first and second terminals are independent from the central rod.

7. The secondary battery structure as recited in claim 1, wherein a surface of the first terminal contacted with one of the conductive tabs has a protrusion.

8. The secondary battery structure as recited in claim 7, wherein the one of the conductive tabs is penetrated by the protrusion.

9. The secondary battery structure as recited in claim 1, wherein a surface of the second terminal contacted with one of the conductive tabs has a protrusion.

10. The secondary battery structure as recited in claim 9, wherein the one of the conductive tabs is penetrated by the protrusion.

11. The secondary battery structure as recited in claim 1, wherein a surface of the first terminal contacted with one of the conductive tabs is a plane in order to sandwich the one of the conductive tabs by the surface and one of the two battery terminals.

12. The secondary battery structure as recited in claim 1, wherein a surface of the second terminal contacted with one of the conductive tabs is a plane in order to sandwich the one of the conductive tabs by the surface and the other one of the two battery terminals.

* * * * *